United States Patent
Griffey et al.

(10) Patent No.: US 6,577,098 B2
(45) Date of Patent: Jun. 10, 2003

(54) APPARATUS AND METHOD FOR PROVIDING A MOBILE AC POWER SUPPLY

(75) Inventors: Tammy M. Griffey, Fishers, IN (US); Jerry W. Ingram, Cicero, IN (US); Everett Roland Rogge, Alexandria, IN (US); Randall F. Brantley, Fishers, IN (US); Manu B. Gidwani, Charlotte, NC (US)

(73) Assignee: Delphi Technologies, Inc., Troy, MI (US)

( * ) Notice: Subject to any disclaimer, the term of this patent is extended or adjusted under 35 U.S.C. 154(b) by 59 days.

(21) Appl. No.: 09/849,110

(22) Filed: May 4, 2001

(65) Prior Publication Data

US 2001/0043052 A1 Nov. 22, 2001

Related U.S. Application Data

(60) Provisional application No. 60/204,688, filed on May 17, 2000.

(51) Int. Cl.[7] .................................................. H02J 7/00
(52) U.S. Cl. ...................................... 320/104; 320/103
(58) Field of Search ................................ 320/104, 105, 320/103, 114, 107, 113

(56) References Cited

U.S. PATENT DOCUMENTS

| 2,978,596 A | | 4/1961 | Robirds ...................... 307/151 |
| 2,991,376 A | * | 7/1961 | Sherwood et al. .......... 307/156 |
| 3,963,972 A | | 6/1976 | Todd ............................. 320/2 |
| 4,160,857 A | | 7/1979 | Nardella et al. .............. 429/97 |
| 4,791,347 A | | 12/1988 | Britton .......................... 320/2 |
| 5,784,657 A | * | 7/1998 | Manabe ...................... 396/299 |
| 5,982,138 A | * | 11/1999 | Krieger ....................... 320/105 |

OTHER PUBLICATIONS

Product literature from Heart Interface Corporation Feb. 1, 1999.
Co-pending U.S. Design patent application Ser. No. 29/123, 830, filed on May 25, 2000, Attorney Docket No. DP-300149.

* cited by examiner

Primary Examiner—Lawrence Luk
(74) Attorney, Agent, or Firm—Margaret A. Dobrowitsky

(57) ABSTRACT

A mobile AC power system wherein the DC current of battery is converted by a power inverter electrically coupled to the battery terminals and the inverter is also mechanically coupled the battery. An AC outlet is positioned to provide a source of power and the unit has a power input being configured to receive a charging current for the battery. The AC outlet is disabled when the power input is receiving a charge.

25 Claims, 4 Drawing Sheets

APPARATUS AND METHOD FOR PROVIDING A MOBILE AC POWER SUPPLY

RELATED APPLICATION

This application claims the benefit of provisional application Ser. No. 60/204,688 filed May 17, 2000.

TECHNICAL FIELD

The present invention relates generally to portable power systems, and more particularly, to a mobile AC power system for use in remote locations.

This invention relates generally to apparatus for use with a battery and, more particularly, pertains to an apparatus that is selectively operable to convert the battery DC potential to an alternating potential or to charge the battery.

BACKGROUND OF THE INVENTION

Portable power demands have increased in part to technological revolutions and the desire for individuals to enjoy outdoor recreational activities wherein the access to a 115 Volt AC power supply (ie. common household electrical standards) is non-existent or extremely limited.

In addition, typical alkaline batteries discharge quickly and are difficult to recharge. Accordingly, the most efficient means of a portable electric supply is a DC battery. However, and in order to supply an AC current, the battery charge needs converting.

Accordingly, there is a need for a mobile power system that is convenient, portable and takes advantage of the inherent benefit of a 12 volt DC battery.

SUMMARY OF THE INVENTION

In an exemplary embodiment of the present invention a mobile AC power system capable of providing a 115 voltage source with a DC/AC power inverter is provided.

In another embodiment, the mobile AC power system prevents discharging while being coupled to an alternate power supply for charging.

BRIEF DESCRIPTION OF THE DRAWINGS

The invention will be further described in connection with the accompanying drawings in which.

DESCRIPTION OF AN EMBODIMENT OF THE INVENTION

Figure 1:
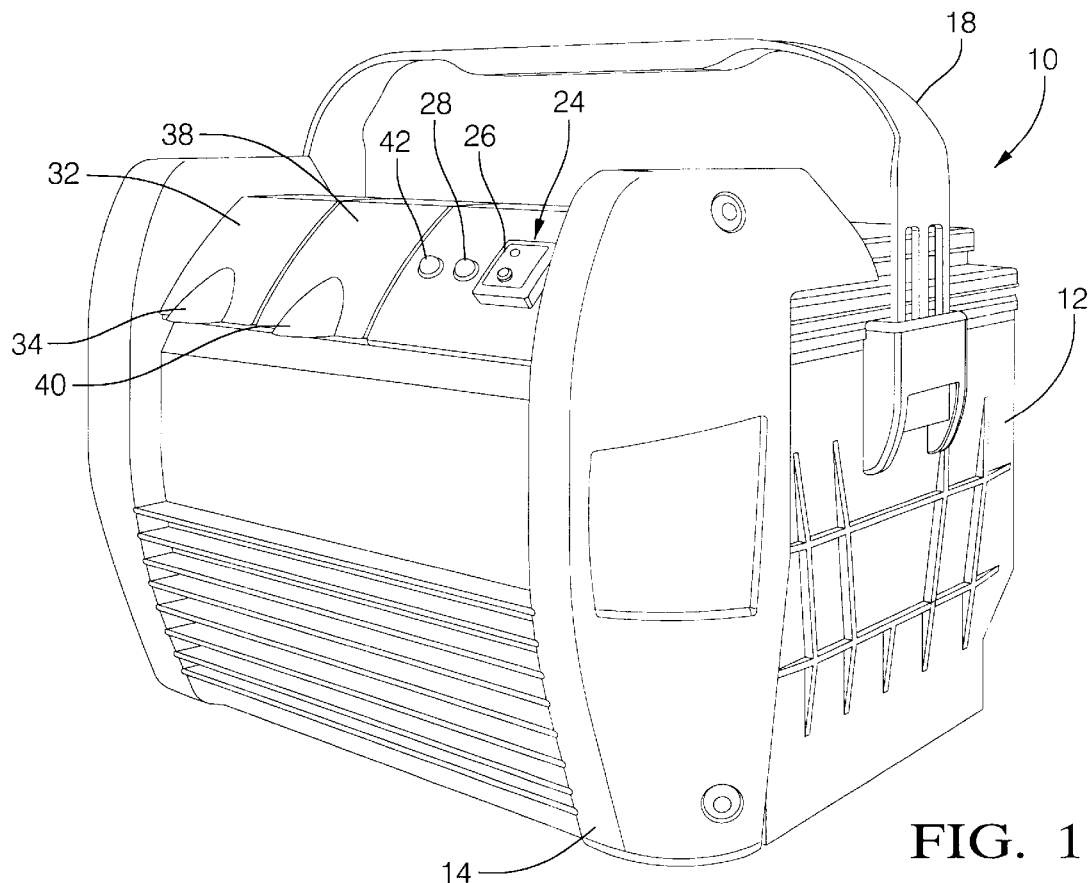
FIG. 1 is a front perspective view of a mobile power system in accordance with the present invention.
Figure 2:
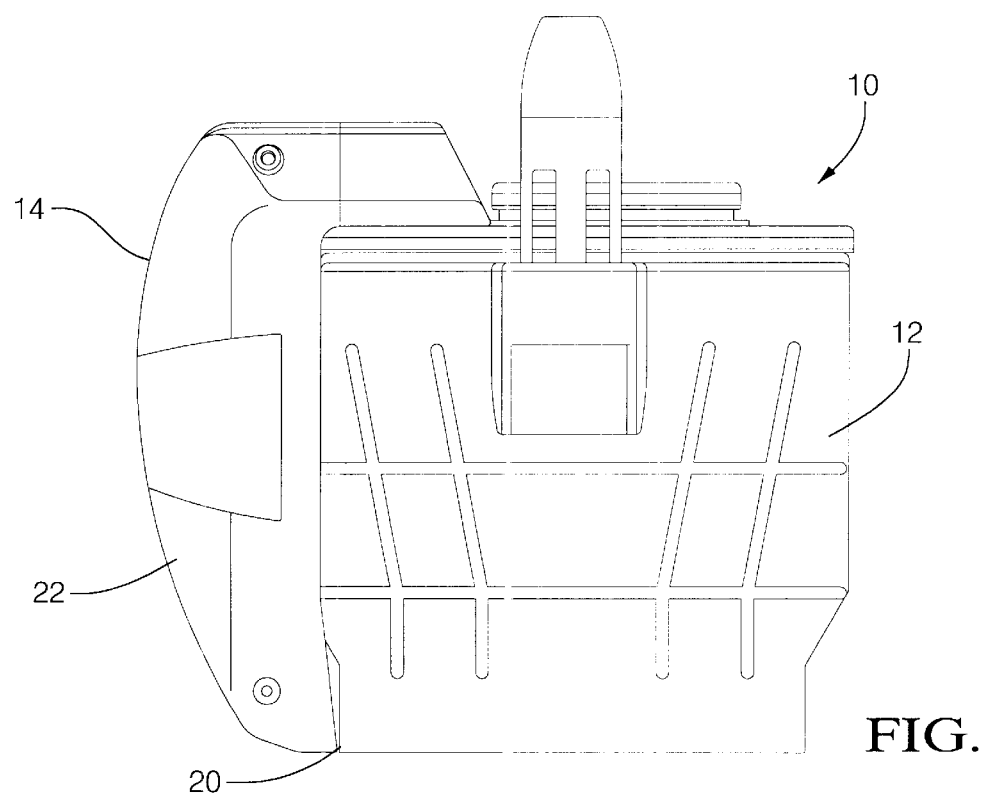
FIG. 2 is side view of the mobile power system as shown in FIG. 1.
Figure 3:
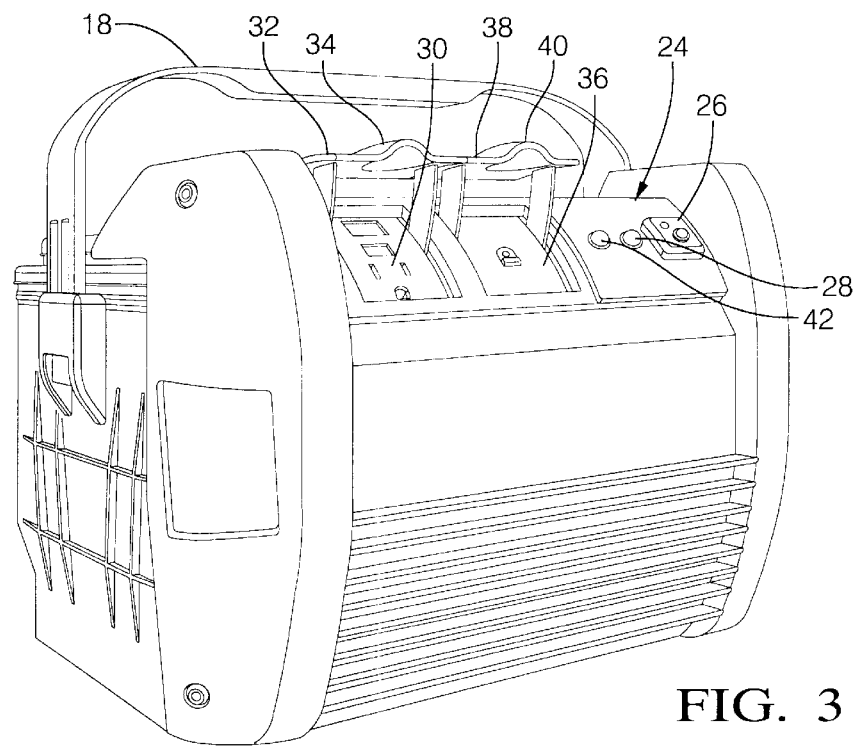
FIG. 3 is another front perspective view of a mobile power system in accordance with the present invention.

Referring now to FIGS. 1–4, a mobile AC power (MACP) system 10 is illustrated. Mobile AC power system 10 includes a battery 12 and a power unit 14. In an exemplary embodiment, battery 12 is a 12-volt DC battery such as a Group 65 absorbent glass mat (AGM) Delphi EEMS battery. Of course, it is contemplated that other batteries may be used in conjunction with the present application.

Power unit 14 is constructed out of a light material that is nonconductive and easily molded, such as plastic or other polymers. In addition, unit 14 provides a dual function in that it includes a power inverter that converts DC current to AC current for providing a source of power while also serving as a charge receptor. Power unit 14 is removably coupled to a pair of battery terminals 16. One terminal 16 is a positive terminal of battery 12 while the other is a negative terminal.

A carrying strap or handle 18 is secured to system 10 in order to allow a user to quickly grab and carry mobile AC power system 10. The weight of unit 14 is sufficiently light enough to render system 10 with an overall weight that makes the unit portable. In an exemplary embodiment, system 10 is approximately 25 kg wherein battery 12 is 20 kg, inverter power unit 14 is 4 kg and a charger DC power supply is 1 kg.

Power unit 14 is configured to be detachable from battery 12. In addition, power unit 14 is configured to be removed without the use of any tools. Thus, and as applications may require, unit 14 can be secured to and removed from battery 12. Alternatively, power unit 14 is permanently secured to battery 12.

In an exemplary embodiment, the input voltage to power unit 14 from battery 12 shall be the output voltage of the battery minus the voltage drop in the circuit connecting the devices together. The terminal voltage is generally between 10.5 and 13.5 volts and the terminal voltage depends on the batteries state of charge (SOC). The preferred charge voltage shall be 15.1+/−0.3 volts for all variations in the charge system. However, the preferred charge voltage can be up to 16.00 volts for short periods. The output resistance of the battery shall be between 5 milliohm to 14 milliohm depending primarily on the age, SOC and the temperature of the battery.

In an exemplary embodiment, the output AC voltage of system 10 shall be 115 volts rms+/−10 volts for a DC input voltage range of 11.0 to 15.4 voltage DC and output loads up to 280 watts. For a DC input voltage range of 10.2 to 11.0 the output voltage shall not be below 115 volts rms AC. The above ranges are intended to provide a preferred mode of operation and are not intended as limitations.

The output waveform of system 10 shall be a modified sine wave (square wave with a 20–35 degree range, power dependent, dwell at the zero crossover) and shall allow normal performance of loads including, but not limited to the following: TVs, VCRs, games and computers. In addition, the modified sine wave should properly operate electronic equipment with switching power supplies and other transformer input power supplies on the electronic devices.

The output frequency of system 10 shall be 60 hertz+/−4.0 hertz over the full range of input and output voltage and currents over the life of the mobile AC power system.

The output current of system 10 shall be a 2.4 amperes rms continuous with the peak of 4.3 amperes at the nominal voltage of 115 volts AC.

Accordingly, and in an exemplary embodiment, a continuous output power of system 10 at an ambient temperature of 25 degrees Celsius or lower shall be 280 watts, the five-minute output rating shall be 300 watts, and the minimum peak output power shall be 500 watts under all conditions of input and output voltage. The maximum power peak shall be of a long enough period to operate virtually all loads rated at the continuous output power or less, and that this peak shall occur only at the start of an operation cycle. The continuous output power rating will diminish with temperatures above 25 degrees Celsius at a rate of 8.7 watts per degrees Celsius. The output power at the maximum operating temperature of 40 degrees Celsius shall be at least 150 watts of continuous AC power.

The inverter shall have a minimum efficiency (DC to AC power conversion) of 80 percent over the full range of input DC and output AC conditions.

The minimum peak output power shall be 1.66 times the nominal continuous power.

The inverter shall allow the battery to be loaded by no more than 2 milliamperes while the inverter is turned off. This will prevent higher parasitic loads upon the battery which may deplete the charge of the battery in a short time.

Storage temperature shall be between −20 degrees Celsius and 52 degrees Celsius for up to one year without system degradation.

Power unit 14 has an inner surface 20 and an outer surface 22. Inner surface 20 is configured to have a shape which is substantially similar to a side wall and a portion of the top of battery 12. In an exemplary embodiment, inner surface 20 is configured to have an upside-down "L" shape. As an alternative, and where a battery mount is utilized inner surface 20 is configured to be secured to the battery mount.

Power unit 14 will be configured to only add a 30 mm increase in the overall height of battery 12, and a 65 mm increase in the width of the battery. Accordingly, the profile of unit 14 when secured to battery 12 will not be much greater than the battery itself. In addition, the upper portion of unit 14 will be configured so as not to block the venting of the battery. In addition, the configuration of unit 14 will prevent the electronics of the inverter and the unit from being exposed to the gases and vapors that may come out of the vent of battery 12.

Outer surface 22 is configured to have a control panel portion 24. An on/off switch 26 is located upon control panel portion 24. Switch 26 electrically connects power unit 14 to battery 12. An LED indicator light 28 illuminates and provides an indication that power unit 14 has been electrically connected to battery 12 via switch 26. Led indicator light 28 will have a green illumination when the power is on and will illuminate as red indicating that the DC voltage is below a given value, namely, a voltage sufficient to supply an adequate voltage.

LED 28 will be green when indicating that the inverter is on (i.e. AC power is available at the system output receptacle 30). LED 28 will be red when indicating a "fault" (i.e. overload, over temperature, and under voltage DC) condition that shall shut the inverter off.

An AC outlet 30 is positioned to be accessed from control panel 24. Outlet 30 is electrically coupled to power invert 14 and provides a means for coupling a plug of an accessory to a source of an AC current. Outlet 30 is a single North American 3-pronged plug receptacle.

A cover plate 32 is pivotally mounted to control panel 24. Cover plate 32 pivots from a closed position (FIG. 1) wherein outlet 30 is covered to an open position (FIG. 3) wherein access is provided to outlet 30. When cover plate 32 is in a closed position outlet 30 is protected from contaminants that such as dirt, debris and water that may damage or short out the components of MACP 10.

In addition, cover plate 32 is configured to have a protruded portion 34. Protruded portion 34 provides an area to which a user may grip and pivot cover plate 32 from the open position to the closed position. As an alternative, cover plate 32 or switch 26 or both are equipped with a safety feature wherein access to outlet 30 or operation of switch 26 is inhibited by a child safety switch.

In an exemplary embodiment, AC outlet 30 of power unit 14 is equipped with a circuit interruption mechanism wherein the current to outlet 30 is cut off in order to prevent a short circuit.

A DC input receptacle 36 is also positioned on control panel 24. DC input receptacle 36 is configured to receive a DC current from an external power supply 44, powered by the 110 voltage of a common household. A cover plate 38 is pivotally mounted to control panel 24. Cover plate 38 pivots from a closed position (FIG. 1) wherein receptacle 36 is covered to an open position (FIG. 3) wherein access is provided to receptacle 36. When cover plate 38 is in a closed position receptacle 36 is protected from contaminants such as dirt, debris and water that may damage or short out the components of MACP 10.

Cover plate 38 has a protruded portion 40 which provides an area that a user may slip their finger under in order to pivot cover plate 38 and accordingly, reveal DC input receptacle 36.

An LED indication light 42 is illuminated when mobile AC power system is receiving a current through receptacle 36.

LED 42 will be amber/green when indicating the conditions of "being charged" and "charge complete" respectively. LED 42 will be yellow when indicating the battery is "in need of being charged". For example if the battery terminal voltage is at or below 11.0+/−0.3 V (unit to unit) and the inverter is about to shut itself off when the battery terminal voltage gets to 10.5+/−0.3 V (unit to unit), regardless of the DC current drop. The difference between these two voltage is 0.5+/−0.3 volts for each system 10.

In summation, the electronics package will have four LED indications from LEDS 28 and 42 that will indicate to the operational status of electronics Accordingly, and when system 10 requires recharging, a DC current is inputted into receptacle 36 allowing battery 12 to be recharged.

In addition, and as a safety feature, power unit 14 prevents the flow of an AC current through outlet 30 when a DC current is being received by receptacle 36.

A DC power supply 44 shall be configured to plug directly into a wall outlet to provide 3.0 amperes at DC charge current to system 10. Battery 12 shall be an AGM type with 60 ampere-hour capacity at DC-20 hour discharge rate, or 130 minutes at 25 amperes (approximately 54 ampere-hour).

The charge voltage at the battery terminals shall be the maximum of 15.1+/−0.3 volts at the initial current limited phase of the charging cycle. This phase will continue until the voltage reaches the maximum voltage (in an exemplary embodiment this will occur in 26 hours or less). Then the voltage shall drop to 13.3+/−0.3 volts as a float charge, the float charge time period will have no time limit. This charge cycle is repeated every time the DC power supply is plugged into the system 10. The charger will be capable of charging the battery from 0% state of charge (10.5 volts at 3 milli ampere current drop) to 97% state of charge (60 ampere-hr. plus charge efficiency) within 26 hours. The definition of 0% state of charge at 25 amperes is a BCI standard. The 100% state of charge is defined as the current in the battery when the terminal voltage is 15.1+/−0.3 volts at 0.200 amperes charging current.

The charger shall not require a control switch. This function will be accomplished with the connectors of power unit 14 at the terminals of battery 12.

The inverter of power unit 14 will have the DC input into the inverter protected by a fuse. The trip point will be above the maximal peak input current by a margin that allows a good measure short-circuit protection to the inverter.

Figure 4:
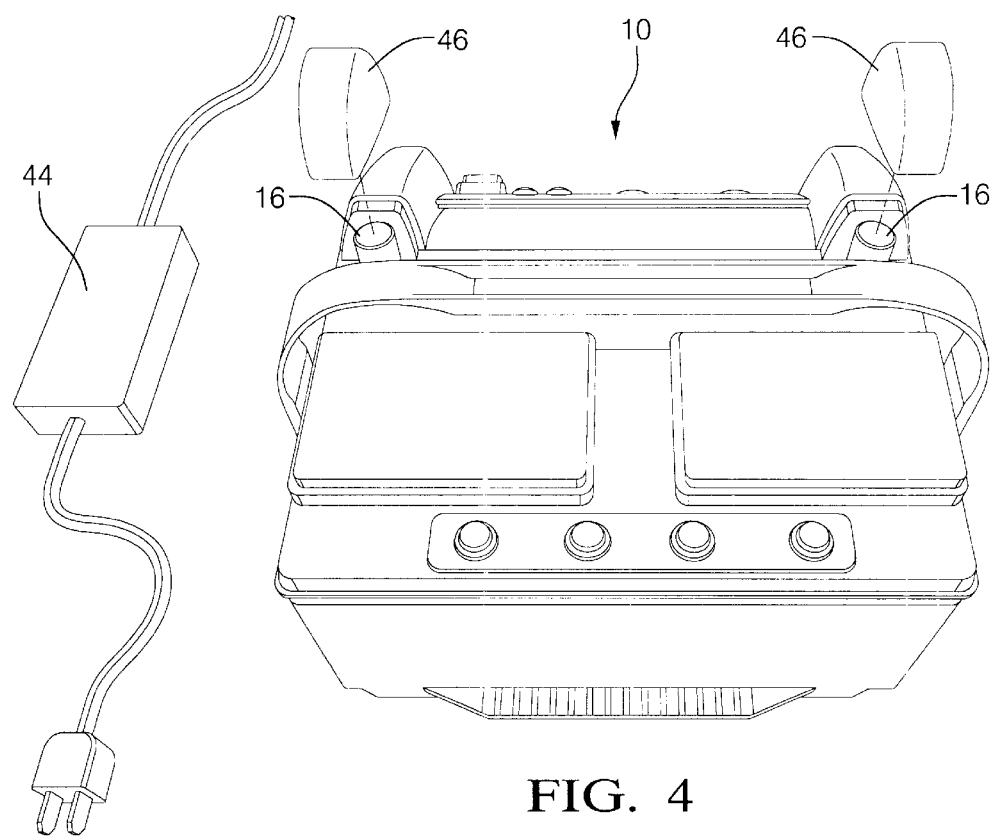
FIG. 4 is a top perspective view of a mobile power system.
Figure 5:
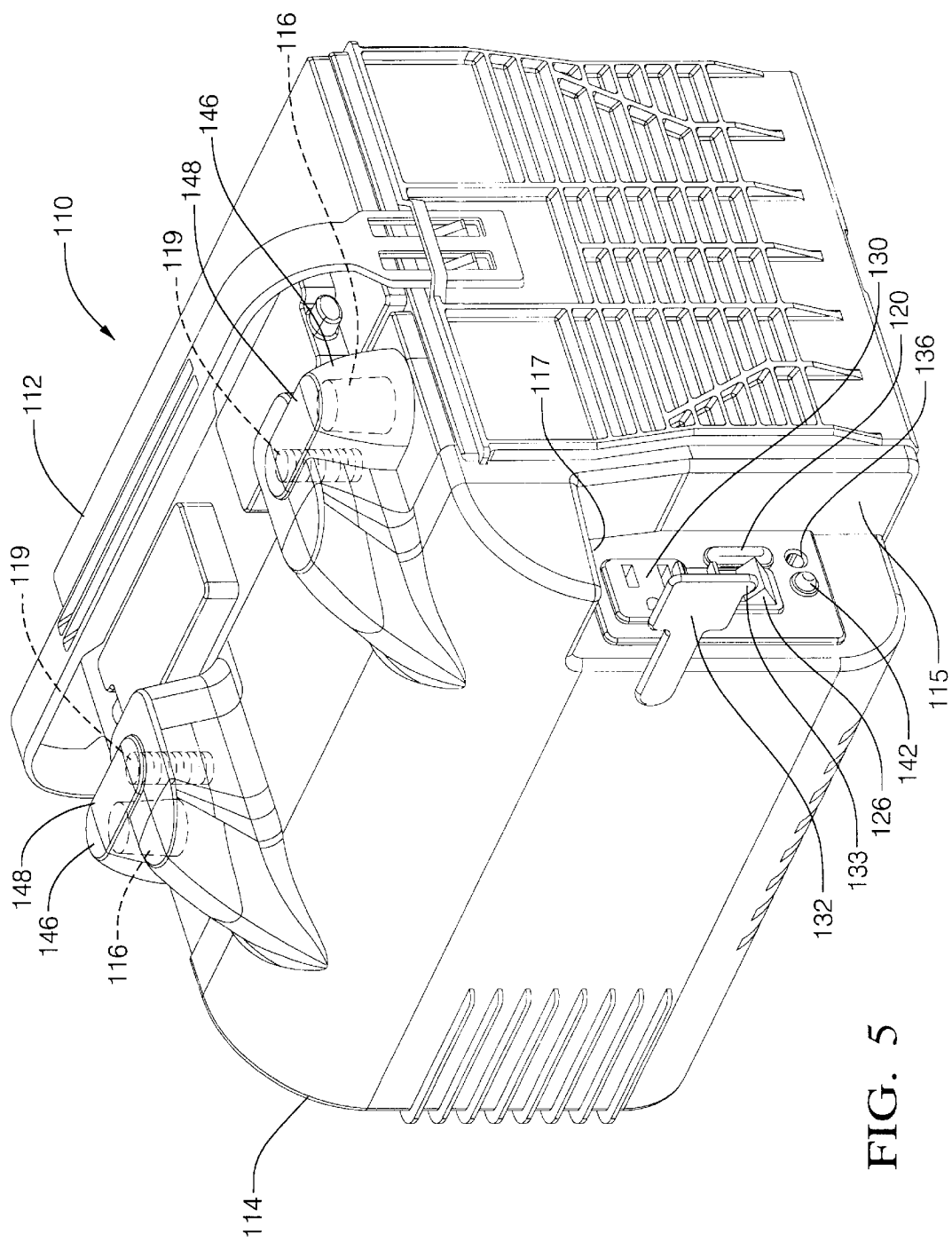
FIG. 5 is a perspective view of an alternative and preferred embodiment of a mobile power system constructed in accordance with the instant application.

Referring in particular to FIG. 4, access is provided to terminals 16 of battery 12. The area of access is sufficient enough to allow an electrical connection to the DC output of terminals 16 in order to provide another battery with a jump start.

Alternatively, mobile AC power system 10 is configured with no access to terminals 16, or a removable cover portion 46 is positioned to allow access to the terminal of battery 12. Removable cover portion 46 is plastic or other nonconductive material that prevents terminals 16 of battery 12 from making an electrical contact with metal objects. Removable cover portion 46 and unit 14 are configured so that removable cover portion 46 is easily removed and/or replaced (ie. snap fitted).

The device will provide a portable source of 120 volts AC power utilizing a 12 volt battery as its DC power source. The device will contain a battery charger that is used for charging the system battery. The chargers power source is 120 volts AC. The device incorporates safety features such as an on/off switch, fuse protection on the DC side and child resistant AC outlet. The device includes convenience features such as a carrying handle, detachable charger and LED indicator lights for charging and AC in use. As an alternative, the device can be configured to prohibit charging while an appliance is utilizing the device's AC outlet.

The amount of force necessary to remove and/or secure power unit 14 to battery 12 is easily applied by the hands of an individual. Accordingly, no tools are required to secure and/or remove unit 14 from battery 12.

Power inverter 38 is equipped with a conventional 3-prong outlet 30. Outlet 30 allows the user to power an electrical power device with the charge of battery 12.

This combination provides a quick and convenient means for providing a remote power supply.

For example, and in outdoor activities such as camping and/or marine applications, battery 12 can provide a source of power.

The portable configuration may be used as a power pack, wherein battery 12 provides electrical energy that may be accessed by a user, for example, via outlet 30.

Referring now to FIGS. 5–8, an alternative and exemplary embodiment of the present invention is illustrated. Here, component parts performing similar or analogous functions are numbered in multiples of 100. In this embodiment, power unit 114 is configured to have an AC outlet 130 positioned along a side portion of power unit 114. In addition, a DC input receptacle 136, a switch 126, and a pair of LED indicator lights 120 and 142 are also positioned along a side portion of power unit 114.

Power unit 114 is also configured to have a relief area 115 into which AC outlet 130, DC input receptacle 136, switch 126 and LED indicator lights 120 and 142 are located.

A flexible cover 132 is secured to power unit 114 and is configured to cover outlet 130 when not in use. In an exemplary embodiment, flexible cover 132 is constructed out of a nonconductive flexible material such as polyethylene. Cover 132 is secured to inverter 114 at one end and is configured to have a pair of members which are received into outlet 130. In addition, cover 132 is configured to have a tab portion 133. Tab portion 133 provides an area to be grabbed by the fingers of an individual in order to remove cover 132 from outlet 130. Of course, other nonconductive materials such as rubber may also be used.

Relief area 115 has an awning portion 117 that shelters outlet 130, on/off switch 126, LED indicator lights 120 and 142, and DC input receptacle 136 from the elements such as rain, snow and other precipitations.

A pair of removable cover portions 146 allows access to the terminals of battery 112. Removable cover portion 146 is configured so that it is easily removed and/or replaced (i.e. snap fitted). As an alternative, a pair of flexible connectors 148 are secured to inverter 114 at one end and one of removable cover portions 146 at the other. This allows cover portion 146 to be removed while it is still secured to inverter 114, allowing for ease of replacement and less likelihood that removable cover portion 146 may be lost. In addition, removable cover portions 146 and inverter 114 are configured so that as portions 146 are removed, the terminals 116 of battery 112 are easily accessed. This allows for ease of recharging of battery 112 by a conventional battery charger as well as utilizing unit 110 to jump start a vehicle. In an exemplary embodiment, flexible connectors 148 are constructed out of polyethylene. Of course, other flexible nonconductive materials such as rubber may be used.

Battery 112 is also equipped with a pair of secondary or marine terminals 119 to which unit 114 is electrically secured. Marine terminals 119 are provided with a threaded portion that allows inverter 114 to be secured to the positive and negative terminals of battery 112. Accordingly, the electronics of inverter 114 are secured to the terminals of battery 112. In addition, and with this configuration, inverter 114 is secured to terminals 119 while also allowing access to terminals 116. In an exemplary embodiment, terminals 116 are conventional automotive battery terminals.

Figure 6:
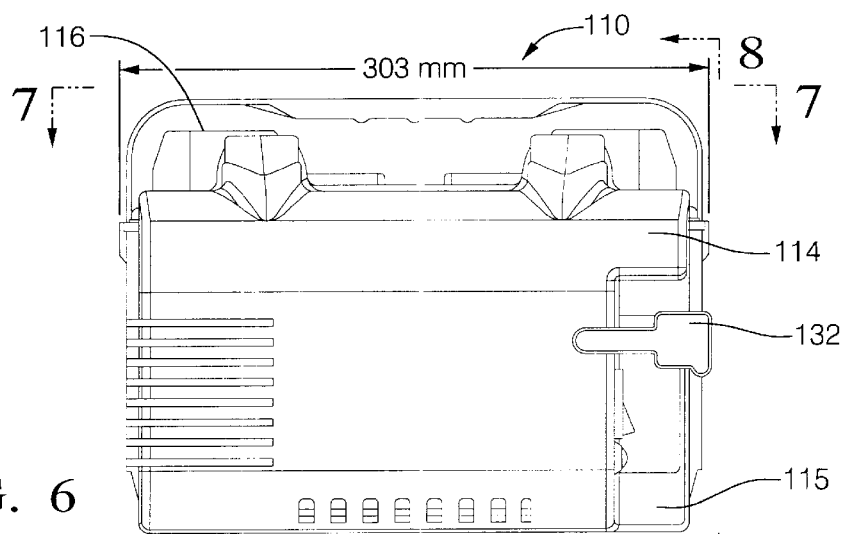
FIG. 6 is a front elevation of the FIG. 5 embodiment.
Figure 8:
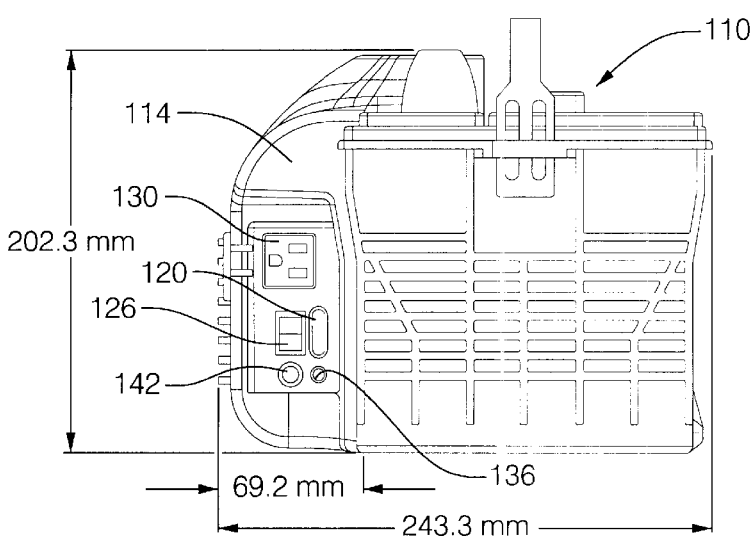
FIG. 8 is a view along lines 8—8 of FIG. 6.

In an exemplary embodiment, and referring in particular to FIGS. 6 and 8, the overall width of the unit is 303 mm and the overall height of the unit is 202.3 mm. The thickness of the unit from front to back is 248.3 mm. Of course, and as applications may require, these dimensions may vary.

Figure 7:
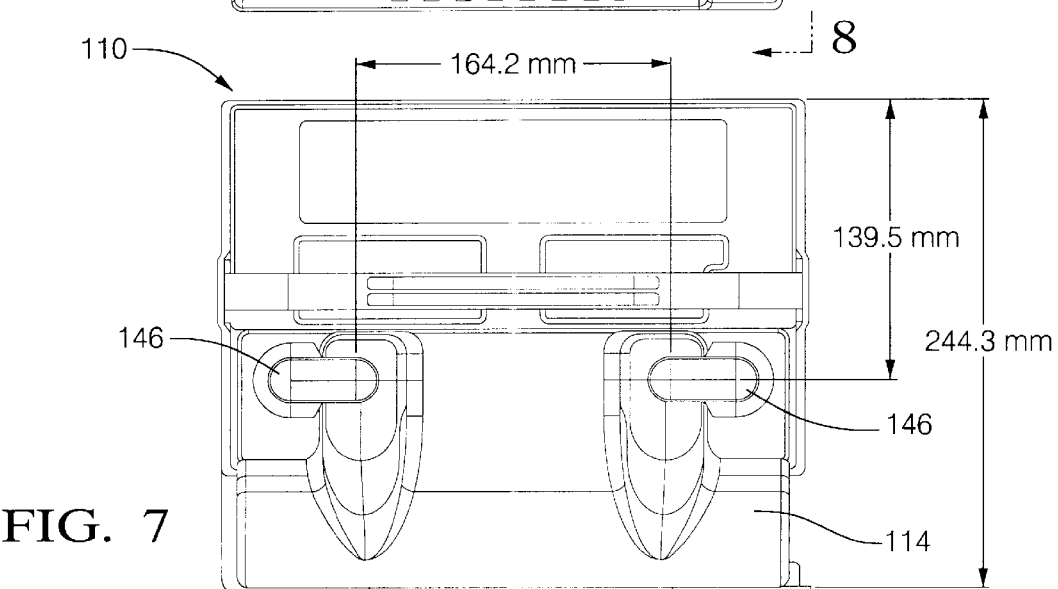
FIG. 7 is a view along the lines 7—7 of FIG. 6.

In an exemplary embodiment and referring in particular to FIG. 7, the dimension between the center of battery terminals 119 is 164.2 mm, the overall depth of the unit is 244.3 mm and the depth of the unit from the back to the center of terminals 119 is 139.5 mm. Of course, and as applications may require, these dimensions may also vary.

The overall configuration of inverter 114 does not substantially change the overall profile and configuration of unit 110. In addition, inverter 114 is secured to the top portion of battery 112 via its connection to terminals 119. As an alternative, inverter 114 is configured to be secured to the bottom portion of battery 112. Accordingly, inverter 114 can be configured to have a securement means for being snap fitted to the bottom portion of battery 112.

In addition, and as an alternative, the back portion of inverter 114 is configured to have a surface configuration that is configured to match the surface configuration of the side of battery 112 to which it is mounted. This will provide a more rigid securement of inverter 114 to battery 112, as well as providing a more uniform appearance.

In addition, the exterior surface of inverter 114 can be configured to continue any design or configuration of the sidewalls of battery 112. For example, the horizontal lines illustrated on the surface of inverter 114 in FIG. 5 may be a continuation of horizontal lines on the sidewalls of battery 112.

As an alternative means for securement of inverter 114 to battery 112, a securement member (not shown) is secured to battery 112 and provides a means for securing inverter 114.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A mobile AC power system comprising:
    a twelve volt battery;
    a power inverter electrically coupled to a pair of battery terminals of said battery, said power inverter also being mechanically coupled to said battery;
    an AC outlet being positioned on said inverter;
    a power input being configured to receive a charging current for said battery, said charging current increasing said batteries state of charge, wherein said AC outlet is disabled when said power input receives a charge;
    a control panel being positioned on the outer surface of said inverter, said control panel housing said AC outlet and said power input and wherein said power inverter is fixedly secured to a pair of terminals of said battery and encases said pair of terminals of said battery.

2. The mobile AC power system as in claim 1, wherein said power inverter is configured to have a first dimension large enough to span from the bottom of said battery and to encase said pair of terminals.

3. The mobile AC power system as in claim 2, wherein said power inverter is configured to have a second dimension no greater than the largest dimension between a pair of side walls of said battery.

4. The mobile AC power system as in claim 2, further comprising:
    a carrying handle secured to said battery.

5. A mobile AC power system, comprising:
    a twelve volt DC battery:
    a power inverter electrically coupled to a pair of battery terminals of said battery, said power inverter also being mechanically coupled to said battery;
    an AC outlet being positioned on a surface of said power inverter;
    a DC power input being configured to receive a charging current for charging said battery;
    a control panel being positioned on the outer surface of said inverter, said control panel housing said AC outlet and said power input;
    a protective member being configured, dimensioned and positioned to provide a protective covering of said AC outlet; and
    a pair of protective members being configured, dimensioned and positioned to cover said terminals of said battery.

6. The mobile AC power system as in claim 5, wherein said pair of protective members are removably secured to said terminals.

7. The mobile AC power system as in claim 6, further comprising:
    h) a pair of flexible connectors being secured to said power inverter at one end and one of said pair of protective members at the other.

8. A mobile AC power system, comprising:
    a twelve volt DC battery:
    a power inverter electrically coupled to a pair of battery terminals of said battery, said power inverter also being mechanically coupled to said battery;
    an AC outlet being positioned on a surface of said power inverter;
    a DC power input being configured to receive a charging current for charging said battery;
    a control panel being positioned on the outer surface of said inverter, said control panel housing said AC outlet and said power input;
    a protective member being configured, dimensioned and positioned to provide a protective covering of said AC outlet, wherein said protective member is constructed out of a nonconductive material.

9. A mobile AC power system, comprising:
    a twelve volt DC battery:
    a power inverter electrically coupled to a pair of battery terminals of said battery, said power inverter also being mechanically coupled to said battery;
    an AC outlet being positioned on a surface of said power inverter;
    a DC power input being configured to receive a charging current for charging said battery;
    a control panel being positioned on the outer surface of said inverter, said control panel housing said AC outlet and said power input;
    a protective member being configured, dimensioned and positioned to provide a protective covering of said AC outlet; and
    an on/off switch for connecting said power inverter to the terminals of said battery.

10. A mobile AC power system comprising:
    a DC battery:
        a power inverter electrically coupled to a pair of battery terminals of said battery, said power inverter also being mechanically coupled to said battery, said power inverter being configured to provide a recessed area;
        an AC outlet being positioned in said recessed area;
        a DC power input being configured to receive a charging current for charging said battery;
        a control panel being positioned on the outer surface of said inverter, said control panel housing said AC outlet and said power input; and
        a protective member being configured, dimensioned and positioned to provide a protective covering of said AC outlet.

11. The mobile AC power system as in claim 10, wherein said recessed area is positioned along a side of said power inverter.

12. The mobile AC power system as in claim 11, wherein said recessed area is recessed from both a front surface and a side surface of said power inverter.

13. The mobile AC power system as in claim 10, wherein said recessed area provides an awning portion for said AC outlet.

14. The mobile AC power system as in claim 10, wherein said protective member is constructed Out of a flexible nonconductive material.

15. The mobile AC power system as in claim 10, further comprising a pair of removable cover portions for allowing access to said pair of battery terminals.

16. The mobile AC power system as in claim 15, wherein said power inverter is electrically coupled to a pair of secondary terminals of said battery.

17. The mobile AC power system as in claim 15, wherein said power inverter is threadingly engaged to said pair of secondary terminals of said battery.

18. The mobile AC power system as in claim 15, further comprising:
   a pair of flexible connectors each being secured to said power inverter at one end and one of said pair of protective members at the other.

19. The mobile AC power system as in claim 15, wherein said removable cover portions are configured to snap-fit onto said power inverter.

20. The mobile AC power system as in claim 15, further comprising:
   an on/off switch for connecting said power inverter to the terminals of said battery.

21. The mobile AC power system as in claim 15, wherein said power inverter is configured to continue the exterior façade or features of the exterior of said battery.

22. The mobile AC power system as in claim 15, wherein said AC outlet includes a circuit interruption mechanism.

23. The mobile AC power system as in claim 22, wherein said recessed area is positioned along a side of said power inverter.

24. The mobile AC power system as in claim 23, wherein said recessed area is recessed from both a front surface and a side surface of said power inverter.

25. The mobile AC power system as in claim 24, wherein said recessed area provides an awning portion for said AC outlet.

* * * * *